United States Patent [19]
Holt et al.

[11] Patent Number: 4,763,246
[45] Date of Patent: Aug. 9, 1988

[54] MICROPROGRAM CONTROL

[75] Inventors: Nicholas P. Holt, Hadfield, via Hyde; Brian J. Procter, Hyde, both of Great Britain

[73] Assignee: International Computers Limited, London, England

[21] Appl. No.: 765,379

[22] Filed: Aug. 13, 1985

[30] Foreign Application Priority Data

Aug. 18, 1984 [GB] United Kingdom ............... 8421066

[51] Int. Cl.⁴ .................................................. G06F 9/22
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,404,378 | 10/1968 | Threadgold et al. | 364/200 |
| 3,979,729 | 9/1976 | Eaton et al. | 340/172.5 |
| 3,990,054 | 11/1976 | Perlowski | 364/200 |
| 3,991,404 | 11/1976 | Brioschi et al. | 364/200 |
| 4,021,779 | 5/1977 | Gardner | 364/200 |
| 4,131,835 | 12/1978 | Lange | 364/200 |
| 4,491,908 | 1/1985 | Woods et al. | 364/200 |
| 4,649,470 | 3/1987 | Bernstein et al. | 364/200 |

FOREIGN PATENT DOCUMENTS 61-18041 1/1986 Japan .
1433076 4/1976 United Kingdom .

Primary Examiner—Gareth D. Shaw
Assistant Examiner—Rebecca L. Adams
Attorney, Agent, or Firm—Lee & Smith

[57] ABSTRACT

A microprogram controlled data processing apparatus is described, in which each machine-level instruction is divided into a number of phases, and each phase is executed by a sequence of microinstructions. The machine-level instruction is decoded to produce a set of microprogram parameters, and in each phase of the instruction a sub-set of these parameters is selected, and broadcast over a parameter bus to individual decoders which decode the microinstructions, so as to qualify the effects of the microinstructions. The use of parameters in this way allows the same microprogram sequence to be used for several different instruction variants, and hence reduces the total size of the microprogram.

4 Claims, 3 Drawing Sheets

MICROPROGRAM CONTROL

BACKGROUND TO THE INVENTION

This invention relates to microprogram control and, more specifically, is concerned with microprogram controlled data processing apparatus.

U.S. Pat. No. 3,979,729 describes a data processing apparatus in which each machine-level instruction is divided into a number of phases, such as operand address formation, operand fetch, and execute, and each of these phases is implemented by means of a suitable microprogram sequence. An advantage of dividing the instruction into phases is that, in many cases, the same microprogram sequence can be used for corresponding phases of two or more different instructions; this reduces the number of different microprogram sequences required and hence reduces the overall size of the microprogram. For example, a number of different machine instructions may require the address of the operand to be generated in the same way, e.g. by adding a value to a particular base register, and hence these instructions can all share the same microprogram sequence for the address generation phase.

British patent specification No. 1433076 shows a microprogrammed data processing system in which machine-level instructions (macroinstructions) are executed by sequences of microinstructions, and in which each microinstruction is modified by data derived from the machine-level instruction. In this way, the same sequence of microinstructions can be shared between a number of different machine-level instructions. This also reduces the total number of different microprogram sequences required.

However, in spite of the reductions achieved by these techniques, it is still desirable to achieve even greater reductions in the size of the microprogram. This is particularly important where it is desired to implement a complete processor on a single very-large scale integrated circuit (VLSI) chip. The object of the present invention is therefore to provide a way of reducing the size of a microprogram still further, without loss of flexibility in the system.

SUMMARY OF THE INVENTION

The invention provides a microprogram controlled data processing apparatus in which machine-level instructions are divided into a plurality of phases, each phase being executed by a sequence of microinstructions, the apparatus comprising: means for producing a plurality of microprogram parameters, means for selecting a predetermined subset of the parameters for each phase, and means for combining the selected parameters with the microinstructions to generate control signals for the apparatus.

It can be seen that the parameters qualify the effects of the microinstructions, so that the same microprogram sequence can perform different actions in different instructions. This leads to further possibilities for sharing microprogram sequences between different instructions, and hence leads to a further reduction in the number of microprogram sequences required. For example, the operand address generation phases of two instructions may be the same except that one instruction uses one base register whereas the other uses a different base register. With the present invention, both these instructions can be handled by means of a single microprogram sequence, which receives the identity of the required base register as a parameter.

The invention also allows the microinstruction width (i.e. the number of bits in each microinstruction) to be reduced, since some of the necessary control information is provided by the parameters instead of by microinstructions.

The parameters may, for example, be derived from the current machine-level instruction.

In a preferred form of the invention, the apparatus comprises a plurality of separate functional units, each unit having a separate microprogram store and decoder associated with it, and the parameters are fed to all the decoders in parallel over a parameter bus.

BRIEF DESCRIPTION OF THE DRAWINGS

One data processing apparatus in accordance with the invention will now be described by way of example with reference to the accompanying drawings.

DESCRIPTION OF AN EMBODIMENT OF THE INVENTION

The processing apparatus to be described is a microprogrammed processor designed to obey the ICL 2900 order code (i.e. machine-level instructions) and is constructed as a single VLSI chip. Details of the 2900 order code are described in "The ICL 2900 series" by J. K. Buckle, published by the Macmillan Press Ltd, 1978.

Figure 1:
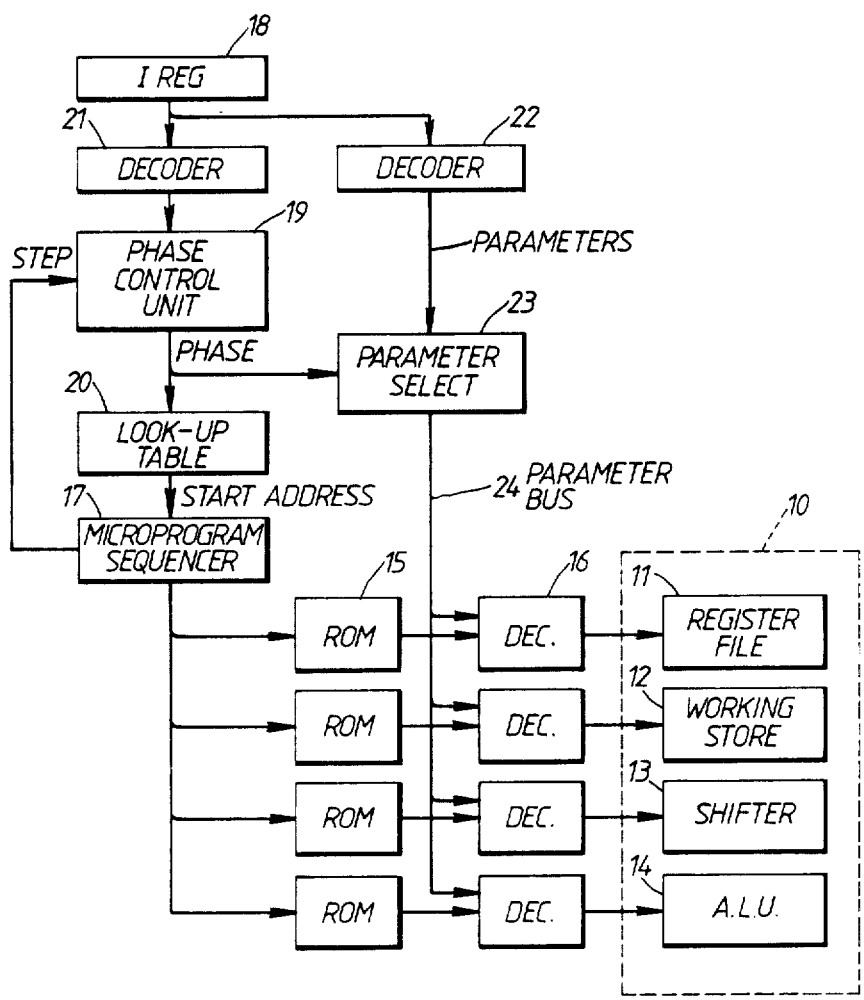
FIG. 1 is a block diagram of the apparatus.

Referring to FIG. 1, the processor comprises a number of functional units, constituting the main data flow 10 of the unit. These functional units include a register file 11, working store 12, shifter 13 and arithmetic and logic unit (ALU) 14. The working store 11 contains certain registers used by the order code, including a local name base register (LNB), extra name base register (XNB), program counter (PC), linkage table base (LTB), top-of-stack register (TOS), accumulator (ACC), and descriptor register (DR).

Each of the functional units has a separate microprogram read-only memory (ROM) 15 and local decoder 16 associated with it, in close physical proximity on the chip. This layout facilitates an orderly design of the chip, avoiding unnecessary crossovers of signal lines. All the ROMs 15 are addressed in parallel by a microprogram address from a microprogram sequencer circuit 17, so as to read out a microinstruction from each of the ROMs 15 in parallel.

The functional units 11–14, the ROMs 15, the decoders 16 and the microprogram sequencer 17 may all be conventional in construction and operation and so need not be described further herein.

The processor has an instruction register 18 which holds the machine-level instruction currently being executed. The execution of each instruction is broken down into a number of phases, and each of these phases is executed by a particular sequence of microinstructions held in the ROMs 15.

The phases are controlled by a phase control unit 19. As will be described in detail below with reference to FIG. 2, this unit is a finite-state machine having a discrete state for each instruction phase. In each state, the unit 19 produces a set of PHASE signals, which indicate the current phase to be executed. These signals are applied to a look-up table 20, to read out the microprogram start address for this phase. The start address is fed to the microprogram sequencer 17, so as to initiate the corresponding sequence of microinstructions.

When the last microinstruction in a sequence is executed, the sequencer 17 produces a STEP signal. This is applied to the phase control unit 19 and causes it to step on to its next state, thereby initiating the next phase of execution.

The contents of the instruction register 18 are decoded by a decoder 21, to produce a set of steering signals for the phase control unit 19. As will be described in more detail below, these signals indicate the type of instruction (read, write, jump etc.) and type of operand (literal, register, virtual etc.) associated with the instruction. These signals are used to steer the phase control unit to its next state at each STEP signal. Thus, it can be seen that for each machine instruction, the phase control unit will be steered through a predetermined succession of states, corresponding to the sequence of phases required to execute the instruction.

The contents of the instruction register 18 are also decoded by another decoder 22 to produce a set of microprogram parameters. These parameters are applied to a parameter selection circuit 23. The parameter selection circuit 23 is controlled by the PHASE signals from the phase control unit 19, so as to select a predetermined combination of the parameters in each phase. In general, a different sub-set of parameters is selected in each phase although in some cases different phases may share the same parameters. The selected parameters are applied to a bus 24 which broadcasts them to all the decoders 16 in parallel.

Each decoder 16 decodes the microinstruction received from the corresponding ROM 15, in combination with the parameters on the bus 24, to produce a set of control signals for the corresponding functional unit 11-14. It can be seen that the parameters modify the effects of the microinstructions, thereby enabling a single microprogram sequence to be used for different phases.

Figure 2:
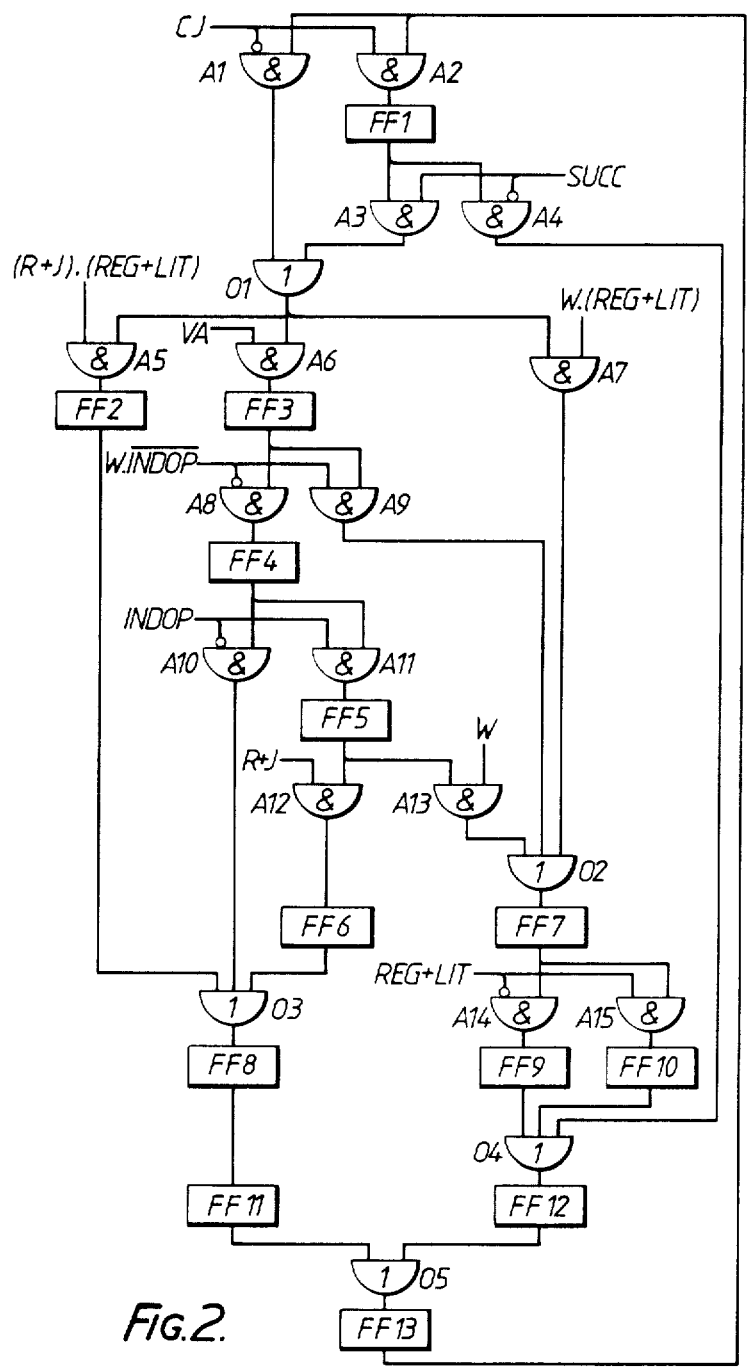
FIG. 2 shows a phase control unit in detail.

Referring now to FIG. 2, this shows the phase control unit 19 in detail.

The unit comprises flip-flops (bistable circuits) FF1-FF13. At any given instant, only one of these flip-flops is set, the others all being unset. Each flip-flop, when set, signifies a particular instruction execution phase, as follows:

| Flip-flop | PHASE |
| --- | --- |
| 1 | CONDITIONAL JUMP |
| 2 | REGISTER READ |
| 3 | PRIMARY ADDRESS |
| 4 | PRIMARY READ |
| 5 | INDIRECT ADDRESS |
| 6 | INDIRECT READ |
| 7 | WRITE EXECUTE |
| 8 | UPDATE 1 |
| 9 | STORE WRITE |
| 10 | REGISTER WRITE |
| 11 | READ EXECUTE |
| 12 | UPDATE 2 |
| 13 | END INSTRUCTION |

The outputs of the flip-flops represent the PHASE signals mentioned above which define the current phase of execution. As described above, these PHASE signals are used to select the appropriate microprogram sequence for executing the phase in question. They also control the parameter selection circuit 23 to select the appropriate microprogram parameters for this phase. Details of the microprogram sequences form no part of the present invention and so need not be described herein.

The flip-flops FF1-FF13 are interconnected by AND gates A1-A15 and OR gates 01-05 as shown, to form a finite state machine. The AND gates also receive the steering signals from the decoder 21.

These steering signals are as follows:

| | |
| --- | --- |
| R | read |
| W | write |
| CJ | conditional jump |
| J | jump |
| REG | register |
| LIT | literal |
| VA | virtual address |
| INDOP | indirect operand |

For example, an instruction that performs a direct write to an operand specified by a virtual address will be decoded to produce signals W and VA; all the other steering signals will be false.

The phase control unit also receives a further steering signal SUCC which indicates a successful jump, i.e. that the jump condition specified in the case of a conditional jump instruction is satisfied. This is derived from a conventional condition testing circuit, not shown.

Each of the flip-flops FF1-FF13 is clocked by the STEP signal from the microprogram sequencer 17. It can be seen that, at each STEP signal, the output of the currently set flip-flop, in combination with the steering signals, causes another one of the flip-flops to be set; at the same time, the first flip-flop is reset. This steps the phase control unit to a new state, so as to indicate the next phase of execution. For any given instruction, the unit is stepped through a succession of states, indicating the successive phases of that instruction.

For example, consider the case of an instruction that performs a direct read of an operand specified by a virtual address. In this case, the steering signals R and VA are true, and the other steering signals are all false. Assume that initially the phase control unit is in the END INSTRUCTION state i.e. the flip-flop FF13 is set and all the other flip-flops are unset.

The AND gates A1 and A6 are therefore enabled. Hence, at the first STEP signal, the flip-flop FF3 is set. This initiates the PRIMARY ADDRESS phase. In this phase, the microprogram adds a displacement value N, derived from a predetermined field of the instruction register 18, to a specified base register LNB, XNB, PC or LTB, to form the operand address.

Since W is false, the gate A8 is now enabled. Hence, at the next STEP signal, the flip-flop FF4 is set. This initiates the PRIMARY READ phase, in which the operand is read, using the address calculated in the previous phase.

Since INDOP is false, the AND gate A10 is now enabled. Hence, at the next STEP signal, the flip-flop FF8 is set. This initiates the UPDATE 1 phase, in which the program counter PC is updated to point to the next machine-level instruction.

At the next STEP signal, the flip-flop FF11 is set. This initiates the READ EXECUTE phase, in which a specified computational operation (e.g. add, subtract, compare, shift etc.) is performed on the operand and the result placed in a specified register.

Finally, at the next STEP signal, flip-flop FF13 is set again. This initiates the END INSTRUCTION phase, in which the next machine-level instruction, at the address indicated by the program counter PC, is fetched and placed in the instruction register 18.

Figure 3:
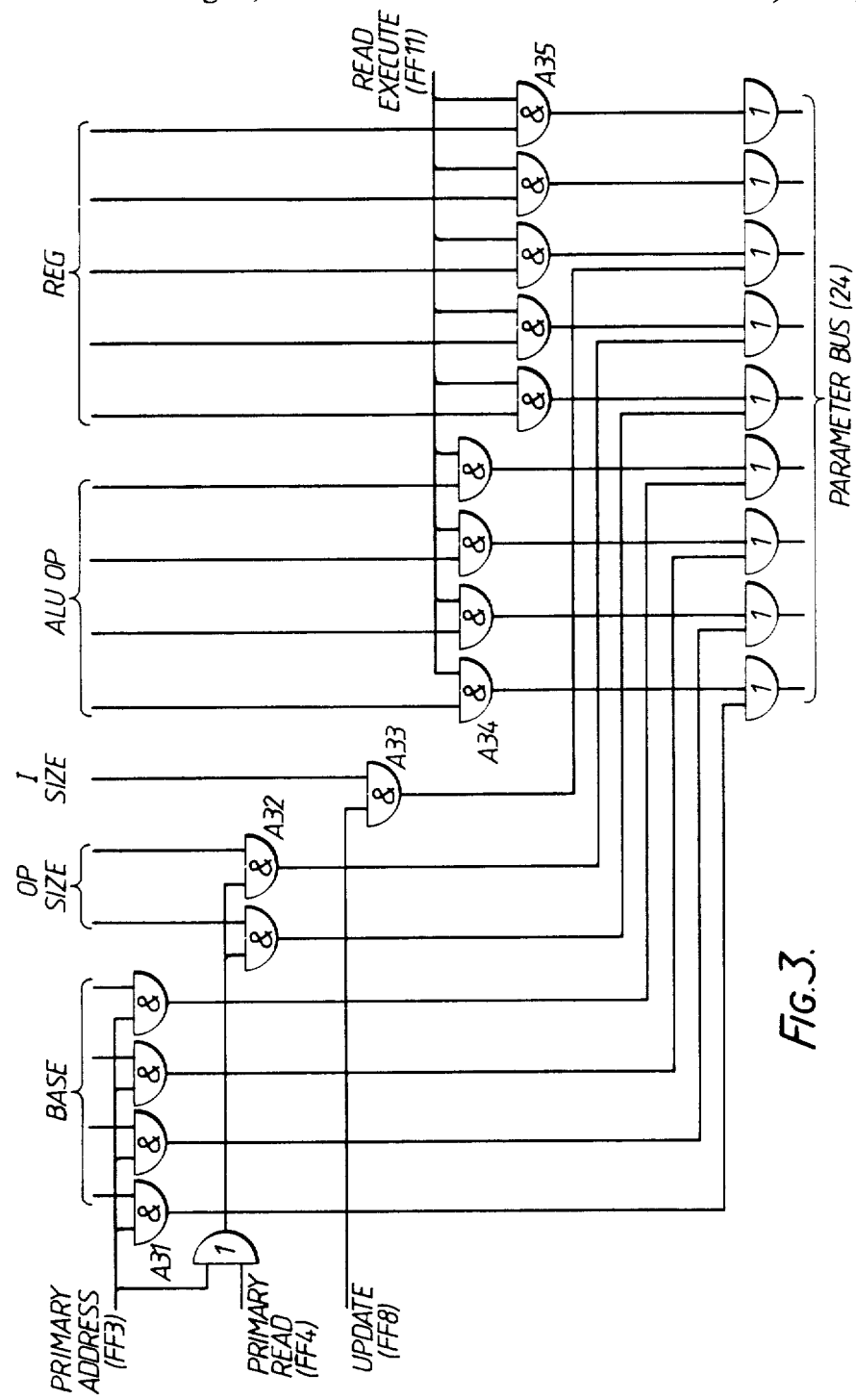
FIG. 3 shows a parameter selection circuit in detail.

Referring now to FIG. 3, this shows the parameter selection circuit 23 in more detail.

As described above, the circuit receives a set of microprogram parameters, derived from the current machine-level instruction, from the decoder 22. These parameters include the following:

BASE: this is a four-bit parameter specifying which of the registers LNB, XNB etc. is to be used as the base register for calculating the operand address.

OP SIZE: this is a two-bit parameter, derived both from the current machine-level instruction and also from an accumulator size register ACS, not shown. It indicates the size of the operand (1, 2 or 4 words).

I SIZE: this is a one-bit parameter, indicating the size of the current machine-level instruction (16-bit or 32-bit).

ALU OP: this is a four-bit parameter, specifying the arithmetic operation (add, subtract etc.) which is to be performed by the ALU14.

REG: this is a five-bit parameter, specifying which of the machine registers is to be used as the source of a second operand and/or as the destination of a result.

The parameter selection circuit consists of a number of sets of AND gates A31-A35, controlled by the PHASE signals from the phase control unit 19. Whenever one of these sets of AND gates is enabled, the corresponding parameter is applied to predetermined lines of the parameter bus 24.

For example, in the PRIMARY ADDRESS phase, the AND gates A31 are enabled, causing the parameter BASE to be applied to the parameter bus. This is used by the microprogram to select the appropriate base register for calculating the operand address. At the same time, the AND gates A32 are enabled, causing OP SIZE to be applied to the bus. This is used to check for address range violations.

In the PRIMARY READ phase, OP SIZE is again applied to the parameter bus, and is used by the microprogram to determine the number of words to be read from the main store.

In the UPDATE phase, gate A33 is enabled, which causes I SIZE to be applied to the bus. This is used to control the amount by which the program counter is incremented to give the next instruction address.

In the READ EXECUTE phase, the parameters ALU OP and REG are applied to the parameter bus to control the ALU operation in this phase.

The selection of parameters for the other phases is similar, and need not be described in detail.

It can be seen that a different sub-set of parameters is selected and placed on the parameter bus in each of these phases. The number of lines making up the parameter bus is determined by the maximum number of bits required to specify the parameters for any one phase. For example, if no phase requires more than sixteen parameter bits, then the parameter bus can comprise just sixteen wires. The parameters for one phase can be placed on the same lines as those for another phase if required. For example, in this case, the four bits indicating the arithmetic operation in the READ EXECUTE phase occupy the same bus lines as those used to specify the base register in the PRIMARY ADDRESS phase.

In conclusion, it can be seen that each phase of the machine-level instruction is executed by a sequence of microinstructions held in the ROMs 15. In previously known arrangements, there would have been a separate microprogram sequence for each variant of a particular phase; for example, there would be a number of different microprogram sequences for the PRIMARY ADDRESS phase, one for each possible base register. In contrast, in the present invention, a single microprogram sequence is able to handle all variations of a particular phase. For example, a single sequence deals with all the variants of the PRIMARY ADDRESS phase; the sequence merely specifies that some base register is to be used, the choice of the base register being determined by the parameter which appears on the parameter bus during this phase.

It should be noted that although in the example described above all the parameters are derived from the current machine-level instruction, in other forms of the invention some or all the parameters may come from other sources, such as from a status register.

We claim:

1. Data processing apparatus comprising:
    (a) an instruction register for holding a machine-level instruction,
    (b) a plurality of separate functional units for performing data processing operations,
    (c) a plurality of microprogram stores, one for each of said functional units, each store holding a plurality of sequences of microinstructions,
    (d) a plurality of decoders connected respectively to said microprogram stores, for decoding said microinstructions to produce control signals for the respective functional units,
    (e) phase control means, responsive to the machine-level instruction in said instruction register, for producing a succession of phase signals indicating a succession of phases required to execute that machine-level instruction,
    (f) microprogram sequencing means responsive to each said phase signal to initiate one of said sequences of microinstructions in each said microprogram store,
    (g) parameter generating means for generating a plurality of microprogram parameters, from the machine-level instruction in said instruction register,
    (h) parameter selection means, controlled by said phase signals, for selecting a predetermined sub-set of said parameters during each said phase, and
    (i) a multi-line bus for applying the selected parameters in parallel to all said decoders to qualify operation of said decoders.

2. Apparatus according to claim 1 wherein said parameter generating means comprises means for deriving said parameters from the machine-level instruction in said instruction register.

3. Apparatus according to claim 1 wherein said phase control means comprises a finite-state machine having a separate state for each said phase.

4. Apparatus according to claim 1 wherein said parameter selection means comprises means for applying different parameters to the same line of said bus during different phases.